United States Patent [19]
Fish et al.

[11] Patent Number: 5,982,385
[45] Date of Patent: Nov. 9, 1999

[54] GEOMETRICAL OBJECT REPRESENTATION SYSTEM AND METHOD FOR EFFICIENTLY REPRESENTING A GEOMETRICAL OBJECT FOR USE BY A COMPUTER GRAPHICS SYSTEM

[75] Inventors: Keith Fish; David Luttropp, both of Ft. Collins, Colo.

[73] Assignee: Hewlett-Packard Co., Palo Alto, Calif.

[21] Appl. No.: 08/903,607

[22] Filed: Jul. 31, 1997

[51] Int. Cl.⁶ ..................................................... G06F 15/00
[52] U.S. Cl. ............................................................. 345/441
[58] Field of Search .................................. 345/435, 433, 345/440, 117, 118, 441

[56] References Cited

U.S. PATENT DOCUMENTS 5,481,662   1/1996   Kouyama et al. ....................... 395/135

Primary Examiner—Phu K. Nguyen

[57] ABSTRACT

A geometrical object representation system efficiently represents primitives for a computer graphics system in order to generate a display of a desired geometrical object surface. A data list repository is configured to maintain a linked list of strip primitives received from an application program. A strip builder traverses the linked list searching for matching vertices of unmatched strips. The strip builder uses a logic manipulation to quickly exclude obvious non-matches. After finding two strips with matching vertices, strip builder joins the two strips together. This joining process creates larger strips which represent the geometrical object in a more compact and efficient form. A graphics system can use this more efficient form of data to reduce data calls and decrease run time in processing the data for rendering by a display.

23 Claims, 14 Drawing Sheets

GEOMETRICAL OBJECT REPRESENTATION SYSTEM AND METHOD FOR EFFICIENTLY REPRESENTING A GEOMETRICAL OBJECT FOR USE BY A COMPUTER GRAPHICS SYSTEM

FIELD OF THE INVENTION

The present invention generally relates to computer graphics systems and, in particular, to a geometrical object representation system and method for enabling efficient representation of a geometric object prior to manipulation of the object representation in a computer graphics system.

BACKGROUND OF THE INVENTION

Computer graphics systems are commonly used for displaying graphical representations of objects on a two-dimensional display. Current computer graphics systems provide highly detailed visual representations of objects and are used in a variety of applications.

A typical computer that employs a computer graphics system is shown in FIG. 1. Referring to FIG. 1, the computer 11 includes a central processing unit (CPU) 12, a system memory 14 for storing software that is executed by the CPU 12, a graphics system 16 for processing graphics data received from the CPU 12, a local interface 18 configured to electrically interconnect the foregoing elements, and a display 21 connected to the graphics system 16 via a connection 22 and configured to display the image data generated by the graphics system 16.

The graphics system 16 breaks down objects to be represented on the display 21 into graphics primitives. "Primitives" are basic components of an image data and may include points, lines, vectors, and polygons, such as triangles and quadrilaterals. Typically, hardware and/or software is implemented in the graphics system 16 in order to render, or draw, the graphics primitives that represent a view of one or more objects being represented on the display 21.

Generally, the primitives of an object to be rendered are defined by the CPU 12 in terms of primitive data. For example, when a primitive is a triangle, the CPU 12 may define the primitive in terms of, among other things, x, y, and z coordinates and color values (e.g., red, green, blue) of its vertices. Additional primitive data may be used in specific applications. The graphics system 16 ultimately interpolates the primitive data to compute the final display screen pixel values that represent each primitive, and the R, G, and B color values for each pixel.

The computer graphics system 16 is configured to receive vertex data from the CPU 12 and define the primitives that make up the view to be displayed. The computer graphics system 16 then processes the image data so the data can be rendered by display 21. The processing of the image data may include processes such as transforming a vertex in space, clipping portions of objects that extend beyond a boundary, enhancing the image data by simulating light conditions, and defining the primitives in terms of mathematical floating point plane equations.

The operations of the graphics system 16 are highly mathematical and computation intensive. One frame of a three-dimensional (3D) graphics display may include on the order of hundreds of thousands of primitives. To achieve state-of-the-art performance, the graphics system 16 may be required to perform several hundred million floating point calculations per second. Furthermore, the volume of data transfer between the CPU 12 and the graphics system 16 is very large. The data for a single quadrilateral may be on the order of sixty-four words of thirty-two bits each. Additional data transmitted from the CPU 12 to graphics system 16 includes light parameters, clipping parameters, and other parameters needed to generate the graphics image for the display 21. The amount of memory and data calls necessary to process all of the parameters for rendering a display increases the run time and, hence, decreases the efficiency of the graphics system 16.

A heretofore unaddressed need exists in the industry for a system and method for efficiently representing a geometrical object in order to minimize the amount of data and data calls needed to process image data in a computer graphics system.

SUMMARY OF THE INVENTION

The present invention overcomes the inadequacies and deficiencies of the prior art as discussed herein by providing for a geometrical representation system and method which efficiently represents a geometrical object for use by a computer graphics system. The preferred use of the present invention is in conjunction with an application which models a geometrical surface by producing strip primitives.

The geometrical representation system and method utilize a strip builder, a data list repository and strip primitives representing discrete elements of a geometrical surface. The strip primitives are preferably produced by an application program which models a geometric surface, and the primitives are ultimately processed by a computer graphics system for rendering by a display. However, before processing by the computer graphics system, the strip builder is preferably configured to discover which strip primitives have matching vertices and to connect these primitives together in order to reduce the number of vertices defining the geometrical object surface. The data list repository is preferably configured to contain strip information so that the joining of strip primitives may be recorded. By building larger strip primitives from smaller strip primitives, the strip builder produces a geometric object surface representation which is more compact and requires less data.

In accordance with another feature of the invention, the strip builder may utilize gate logic to reduce the run time and complexity required to compare strip vertices. For example, the strip builder may take three floating point numbers defining the vertices of a strip primitive and use exclusive-or logic to reduce these numbers into a single unsigned integer. Comparing the exclusive-or integers of strip primitives may decrease the number of comparisons required to discover matches between primitives.

The invention has numerous advantages, a few of which are delineated hereafter, as merely examples.

An advantage of the invention is that it reduces the number of vertices required to define primitives representing discrete elements of an object surface to be displayed. This feature enables less requisite data storage to define the representation of the object surface.

Another advantage of the invention is that it enables other systems to manipulate the data defining the primitives with fewer data calls and less logic complexity.

Another advantage of the invention is that it enables the computer graphics system to process image data with higher speed and performance.

Other features and advantages of the invention will become apparent to one with skill in the art upon examination of the following drawings and detailed description. It is intended that all such additional features and advantages be included herein with the scope of the present invention, as is defined by the claims.

BRIEF DESCRIPTION OF THE DRAWINGS

The invention can be better understood with reference to the following drawings. The drawings are not necessarily to scale, emphasis instead being placed upon clearly illustrating principals of the present invention. Furthermore, like reference numerals designate corresponding parts throughout the several views.

FIG. 4 including

FIG. 5 including

FIG. 6 including

FIG. 7 including

FIG. 10 including

DETAILED DESCRIPTION OF THE PREFERRED EMBODIMENT

Figure 1:
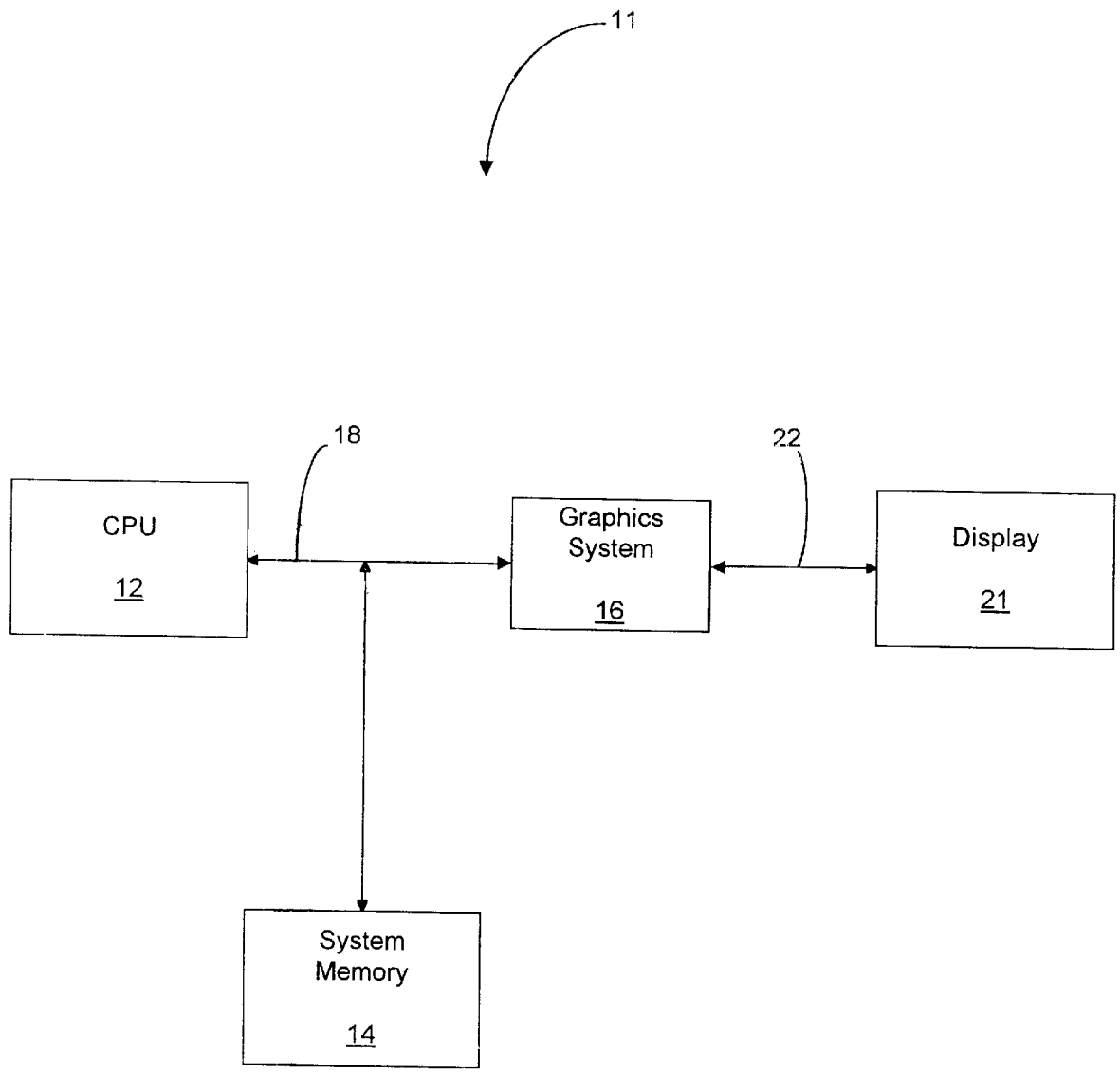
FIG. 1 is a block diagram showing a possible implementation of a computer graphics system in accordance with the prior art.

Generally, an object is rendered for a display by a computer graphics system by first modeling the object's surface with primitive data. Referring to FIG. 1, the primitive data is communicated from CPU 12 to a graphics system 16 where the primitives are processed before rendering on display 21.

Figure 2:
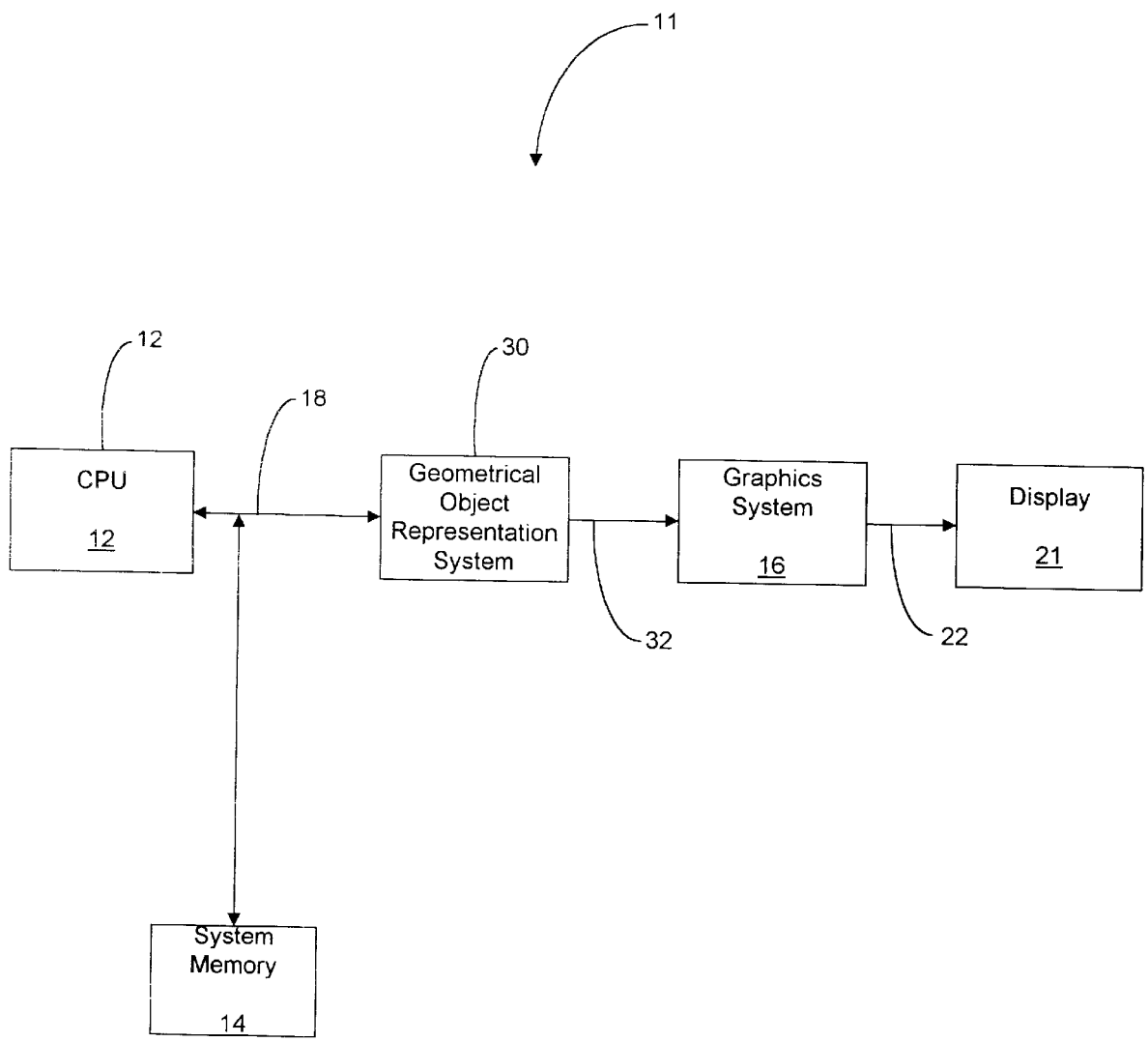
FIG. 2 is a block diagram showing a possible implementation of a geometrical object representation system in accordance with the present invention.

With reference to FIG. 2, the geometrical object representation system 30 of the present invention receives primitive data from CPU 12 through local interface 18 and modifies the primitives before relaying them to the graphics system 16 via connection 32. The geometrical object representation system 30 along with its associated methodology can be implemented in software, hardware, or a combination thereof. Furthermore, the present invention can be implemented as a stand-alone system or as a subsystem within graphics system 16. In the preferred embodiment, the system 30 is stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

Figure 3:
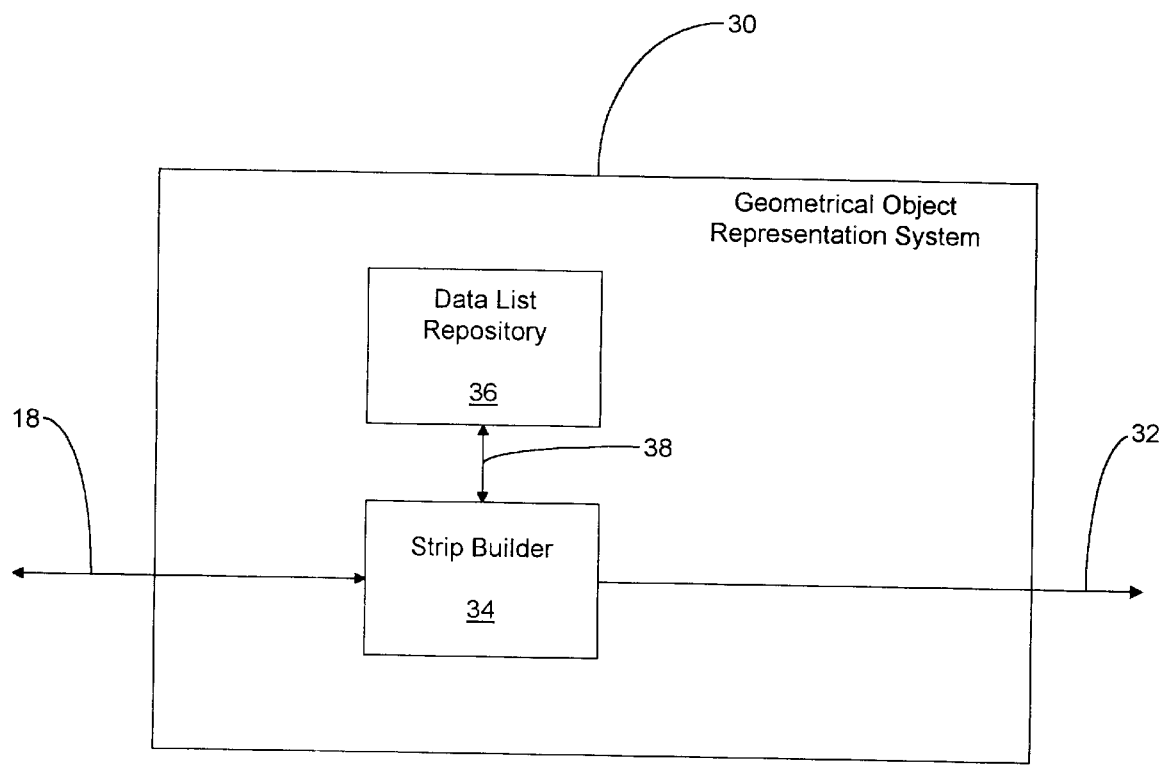
FIG. 3 is a block diagram illustrating the geometrical object representation system of FIG. 2.

As can be seen by reference to FIG. 3, the geometrical object representation system 30 includes a strip builder 34 and a data list repository 36 connected by a connection 38.

The strip builder 34 is preferably configured to traverse through the primitive data received from CPU 12 and to discover triangles with matching vertices. Although primitives can be defined with a variety of geometrical shapes, the present embodiment of the present invention assumes primitives of a triangular shape. However, it should be obvious to one ordinarily skilled in the art that joining primitives of different shapes is also possible.

Primary Matching

Figure 4A:
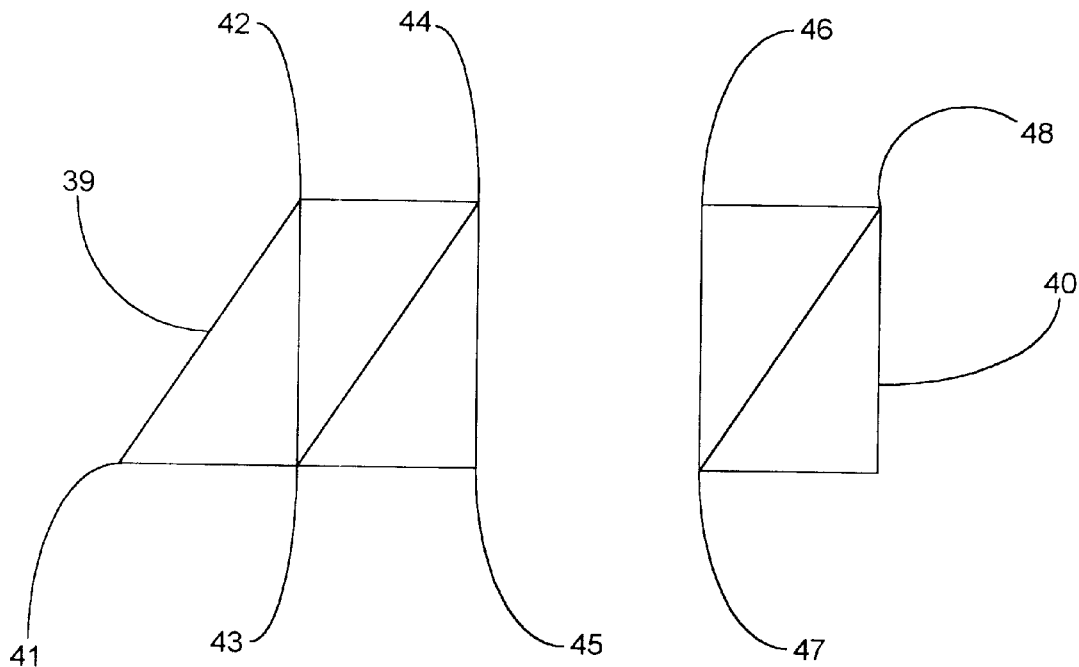
FIGS. 4A–4B is a diagram illustrating the connecting of triangle strips with matching order through primary matching.

In searching for matching vertices, strip builder 34 is preferably configured to find primary matches. A primary match is when two end vertices of two strips match. End vertices are the two vertices defining either a leading edge or a trailing edge of a primitive strip. FIG. 4(A) illustrates two separate triangle strips 39 and 40 that may be joined through primary matching. As used herein, a triangle strip refers either to a single triangle primitive which is not joined with any other primitives or to a collection of single triangle primitives joined together to form a single entity. In this example, triangle strip 39 includes vertices 41, 42, 43, 44 and 45, and triangle strip 40 includes vertices 46, 47 and 48. It should be noted that while other vertices may be present, only the vertices needed to illustrate the concepts of present disclosure are labeled for simplicity purposes.

Figure 4B:
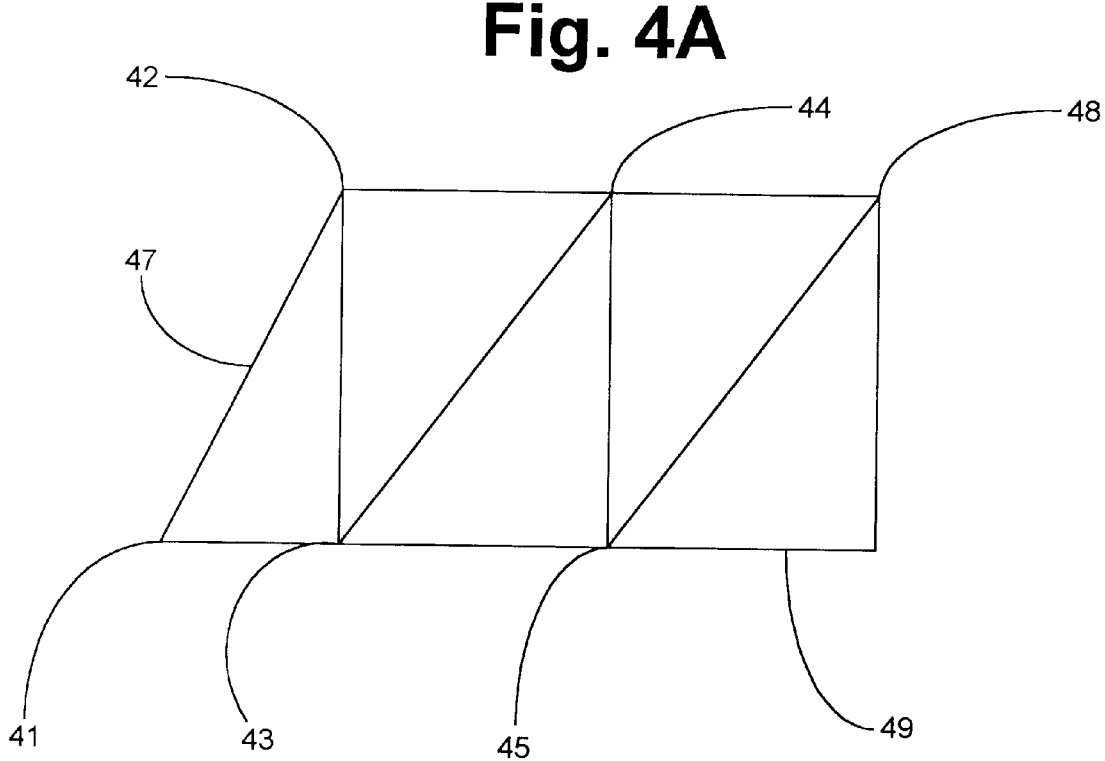

Assuming that vertices 44 and 45 of strip 39 match vertices 46 and 47 of strip 40, respectively, the two strips 39 and 40 form a primary match and can be joined together to form one longer strip 49 as depicted in FIG. 4(B). By doing so, vertices 46 and 47 can be dropped from memory since they are equivalent to vertices 44 and 45, respectively. As a result, the number of vertices defining both strips 39 and 40 can be reduced, thereby reducing the amount of memory required to define the geometrical object surface. By joining other triangles and triangle strips together in the same manner, the overall memory required to define the representation of an object surface can be significantly reduced.

It should be noted that the methodology of the present invention as described herein allows for the joining of strips with vertices in reverse order. Reverse order describes the condition when a leading edge of one strip matches a leading edge of another strip or when a trailing edge of one strip matches the trailing edge of another strip. Extra care may be taken to ensure that vertex orientation, as discussed hereinbelow, of a reversed strip is preserved before the strip is considered a match.

Vertex Orientation

It should be noted that the orientation of the vertices is material in determining matches. The orientation of a triangle refers to the location of the triangle's first vertex, second vertex and third vertex in relation to one another. For each figure illustrated herein, a given triangle's vertex orientation corresponds to the numerical orientation of its reference numbers. For example, the end triangle making up strip 39 in FIG. 4(A) has vertices 43, 44 and 45. The first vertex 43 has been designated with the lowest reference number out of the three reference numbers chosen. The third vertex 45 has been designated with the highest reference number out of the three reference numbers chosen, and the second vertex 44 has been designated by a number between the reference numbers of the other two vertices. Accordingly, examination of the drawing in FIG. 4 reveals that the orientation of the end triangle of strip 39 is in a clockwise direction. To facilitate the determination of the orientation of the strips throughout the several views, each strip has been similarly labeled such that the numerical orientation of a given triangle's reference numbers corresponds to the triangle's orientation.

The orientation of each successive facet within a triangle strip should be opposite to the orientation of the preceding facet. A facet as used herein is an individual primitive making up a primitive strip. For example, in FIG. 4(A), the individual triangle with vertices 41, 42 and 43 is a facet within triangle strip 39, and the individual triangle with vertices 42, 43 and 44 is the next successive facet. As can be seen with reference to FIG. 4(A), the first facet having vertices 41, 42 and 43 within strip 39 has a clockwise orientation. The next facet having vertices 42, 43 and 44 has a counter clockwise orientation which is opposite to that of the first facet having vertices 41, 42 and 43. The next facet having vertices 43, 44 and 45 has a clockwise orientation which is opposite to the orientation of the preceding facet having vertices 42, 43 and 44. The successive facets of each triangle strip within system 30 should be in alternating orientation as depicted by strip 39.

Figure 5A:
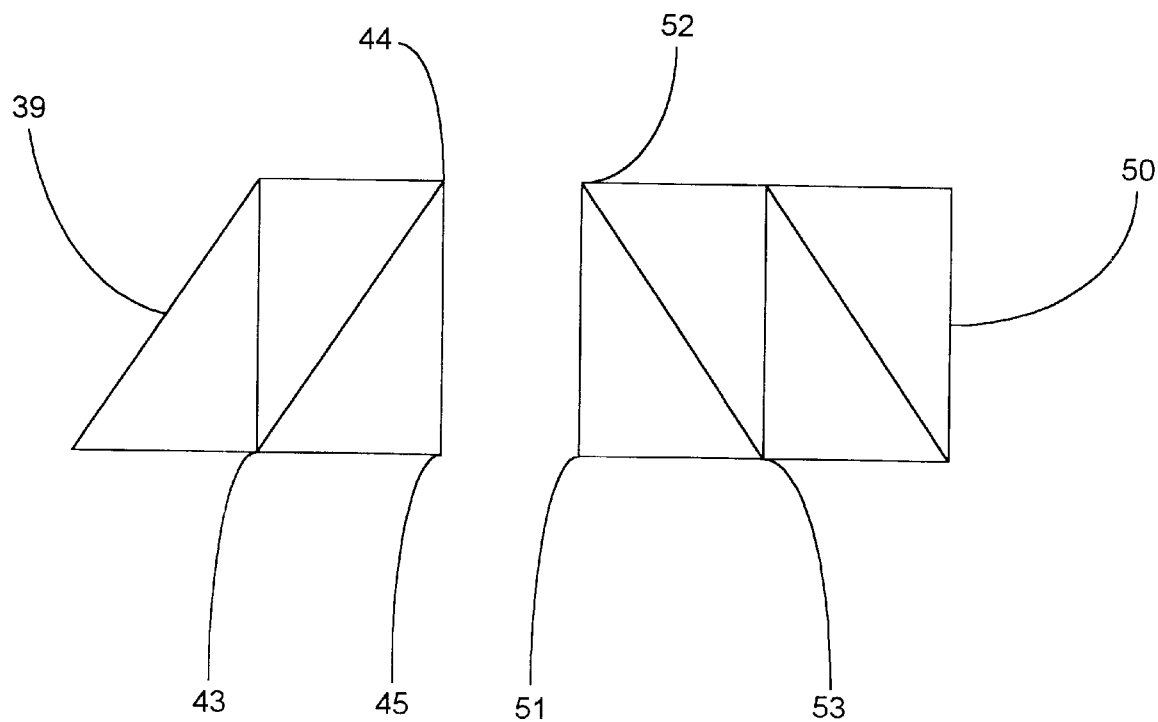
FIGS. 5A–5B is a diagram illustrating the connecting of triangle strips with incompatible facet orientation through primary matching.

To illustrate the effect of a strip's orientation on joining procedures, refer to FIG. 5. FIG. 5(A) shows a possible primary match of two strips 39 and 50 where vertices 44 and 45 match vertices 52 and 51, respectively. However, the orientation of vertices in the end facet of strip 39 is in a clockwise direction, and the orientation of vertices 51, 52 and 53 in the end facet of strip 50 is also in a clockwise direction. Since the orientation of the end facets of strips 39 and 50 is the same (i.e., the order of the vertices of both end facets are in a clockwise direction rather than one in a clockwise direction and the other in a counter clockwise direction such as strips 39 and 40 in FIG. 4(A)), the two strips 39 and 50 of FIG. 5 are considered to be of incompatible orientation and can not be treated as an exact match.

Figure 5B:
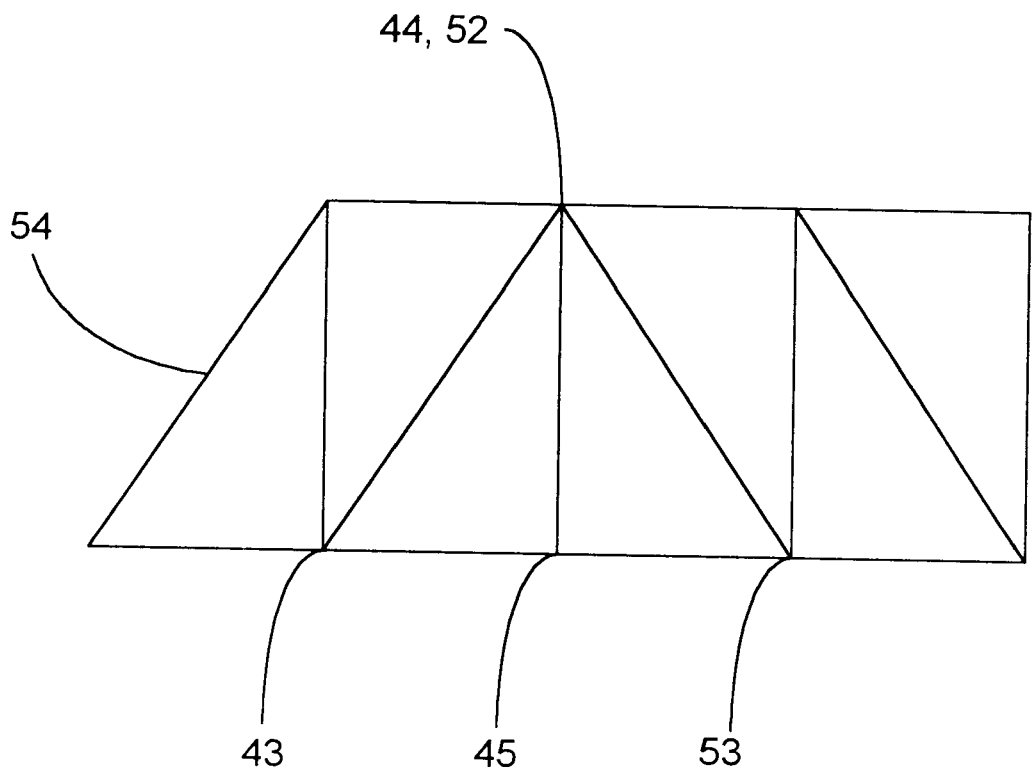

Consequently, as can be seen with reference to FIG. 5(B), only the first vertex, 51, can be removed when the two strips 39 and 50 are joined together to form a larger strip 54. By keeping the redundant vertex 52, a dimensionless facet having vertices 44, 45 and 52 precedes the facet having vertices 45, 52 and 53. This keeps the orientation of new strip 54 in order since the facet having vertices 43, 44 and 45 is separated from the facet having vertices 45, 52 and 53. If it were not for the separating redundant facet having vertices 44, 45 and 52, the two successive facets within strip 54 would not have the same orientation which is an undesirable result. Therefore, when joining two strips with end facets having the same order, only one vertex should be removed in order to preserve the alternating orientation of the new strip.

It should be noted that facet normals may be used to override facet orientation that would otherwise be determined by vertex orientation. A facet normal is data information which specifies the orientation of a facet. In some applications, facet normals may be supplied to the geometrical object representation system 30, and, when facet normals are present, all types of primary and secondary matching may occur. However, when facet normals are not supplied, strip builder 34 is preferably designed to either calculate the facet normals or restrict the joining of triangle strips to only the cases where facet orientation is preserved when strips are joined. Which configuration used is dependent on the implementation of the system 30.

Secondary Matching

Edges of triangle strips that do not have a primary match can still be joined together by strip builder 34 if a secondary match exists. A secondary match can occur when there is a match between two vertices of two different strips, and one of the vertices is not an endpoint vertex. An endpoint vertex is a vertex contained within the leading or trailing edge of a strip. An example of a secondary match is in FIG. 6.

Figure 6A:
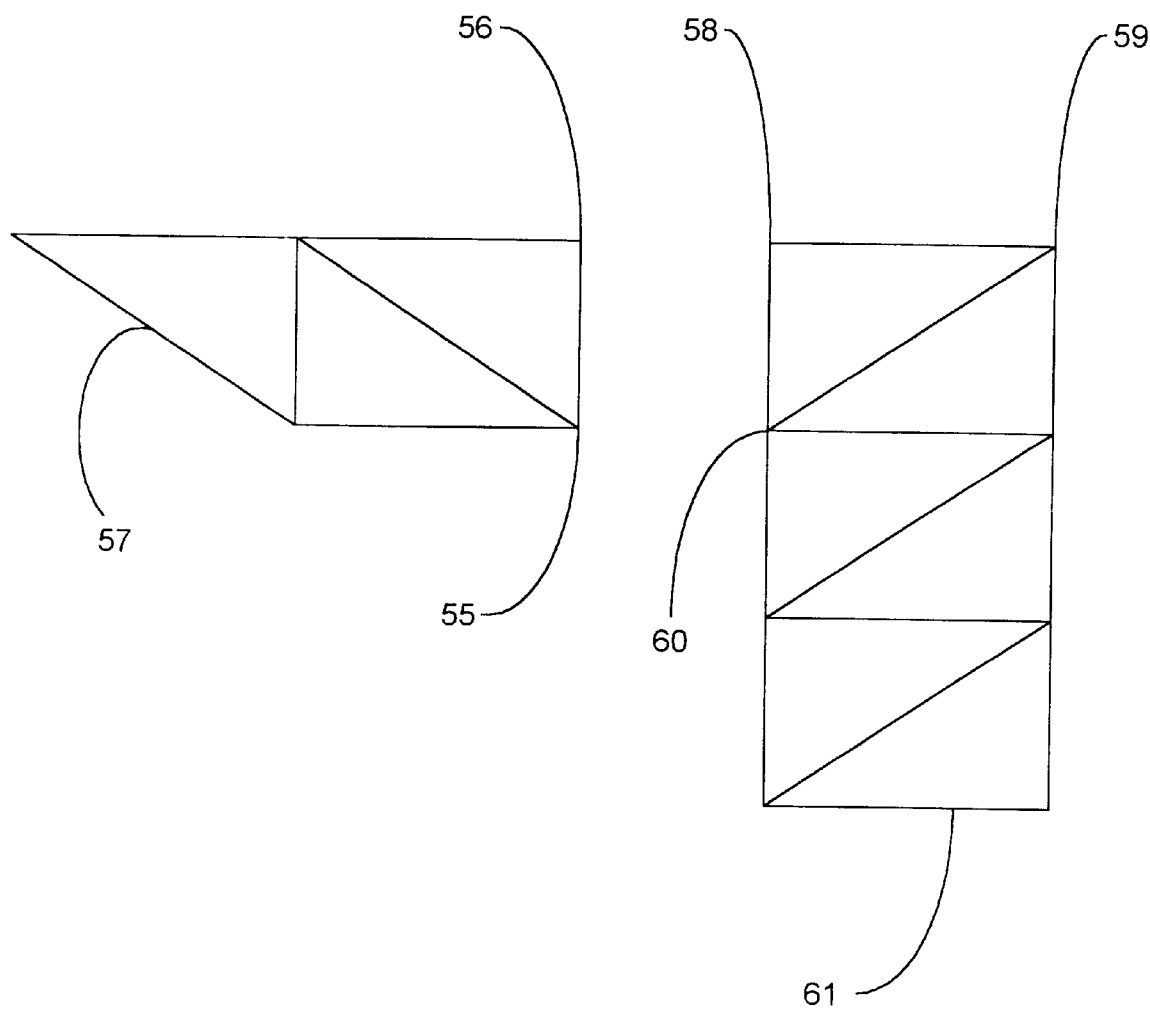
FIGS. 6A–6B is a diagram illustrating the connecting of triangle strips through secondary matching.
Figure 6B:
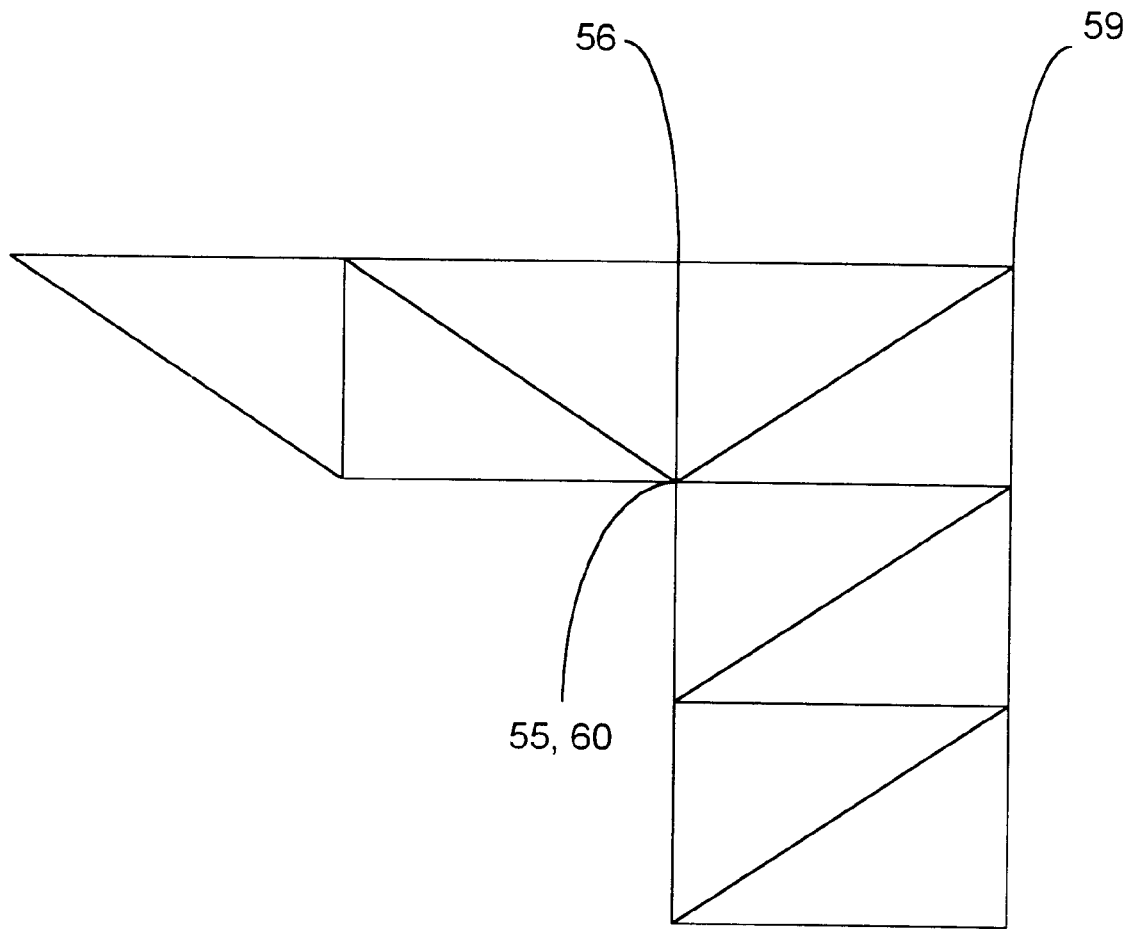

Referring to FIG. 6(A), vertices 55 and 56 of strip 57 match vertices 58 and 60 of strip 61, respectively. However, vertex 60 is not an endpoint vertex of strip 61 (vertices 58 and 59 are the endpoint vertices of strip 61), and, therefore, joining strip 57 to strip 61 according to FIG. 6(B) results in a secondary match. When two strips have been joined by a secondary match, only the endpoint vertex 60 can be removed if facet normals are specified. If no facet normals are specified, then it is possible that no vertices may be removed. However, joining the strips may be beneficial because strip processing overhead may be saved.

It should be noted that an edge of a facet is said to "match" an edge of a second facet when the relevant vertices of the two facets match and are oriented in such a way, as described herein, so as to allow either primary or secondary matching.

Logic Reduction

In order to reduce the number of data calls required to compare triangles, strip builder 34 is preferably configured to utilize a data reduction technique. One such technique is to convert the three floating point numbers defining a vertex of a given triangle into unsigned integers and then to perform an exclusive-or function on the binary representation of these numbers until a single integer remains. Similarly performing an exclusive-or function to the leading end and trailing end vertex pairs (for example, vertex pair 43,45 and vertex pair 44,45 in FIG. 4(A)) results in two more integers. By doing the same to the last and second to last points (vertices 44 and 45 in FIG. 4(A)) and to the first and third points (vertices 43 and 45 in FIG. 4(A)) gives a total of ten integers related to each triangle strip for comparison by strip builder 34. By comparing these integers instead of the floating point values of the vertices, strip builder 34 can quickly pass over combinations that do not match.

Another technique strip builder 34 may use to reduce comparisons is to first test the exclusive-or integer of the end point pairs. For example, in FIG. 4(A), the six floating point numbers associated with vertices 44 and 45 could be converted into a single integer using the exclusive-or function as could the six floating point numbers associated with vertices 46 and 47. Only if these two exclusive-or integers match would strip builder 34 actually compare the floating point numbers of each vertex to ensure an exact match. Accordingly, strip builder 34 can quickly skip over many combinations that do not match by using simple logic reduction and integer comparing.

Data List Repository

When strip builder 34 receives a new data triangle strip from CPU 12, strip builder 34 is preferably configured to insert the new triangle strip into memory in the data list repository 36. Data list repository 36 is preferably designed to maintain an updated linked list of triangle strips. Data list repository 36 can be a database, for example, or any other device capable of storing and managing a linked list.

The linked list in data list repository 36 is preferably a list of individual data structures joined together by pointers where each data structure corresponds to an individual triangle strip received by strip builder 34. The data structure for the triangle strip preferably contains information on the vertices of the strip, whether the strip has been matched, and, if so, to which previous strips the new strip has been matched to. In order to contain this information, each data structure in the linked list is preferably configured to include flags, integers, and pointers.

By setting and resetting flags through techniques known in the art, the structure can indicate whether each end of the strip has been matched and which vertices should be deleted. Integers within the data structure can indicate the values of the exclusive-or integers discussed hereinabove as well as the number of vertices in the associated triangle strip. Furthermore, pointers may be used to indicate the next strip in a joining sequence. As used herein, a joining sequence is a sequence of strips that have been joined together by strip builder 34 to create a single larger strip. For example, when strip builder 34 joins two triangle strips, a next pointer may be defined to point from one strip to the other. These two triangle strips then form a joining sequence where each strip is linked together by the next pointer. In this way, all of the triangle strips in a particular joining sequence can be defined and easily manipulated. By maintaining an updated linked list of triangle strips, strip builder 34 can record every match in data form.

Strip Builder

Figure 7A:
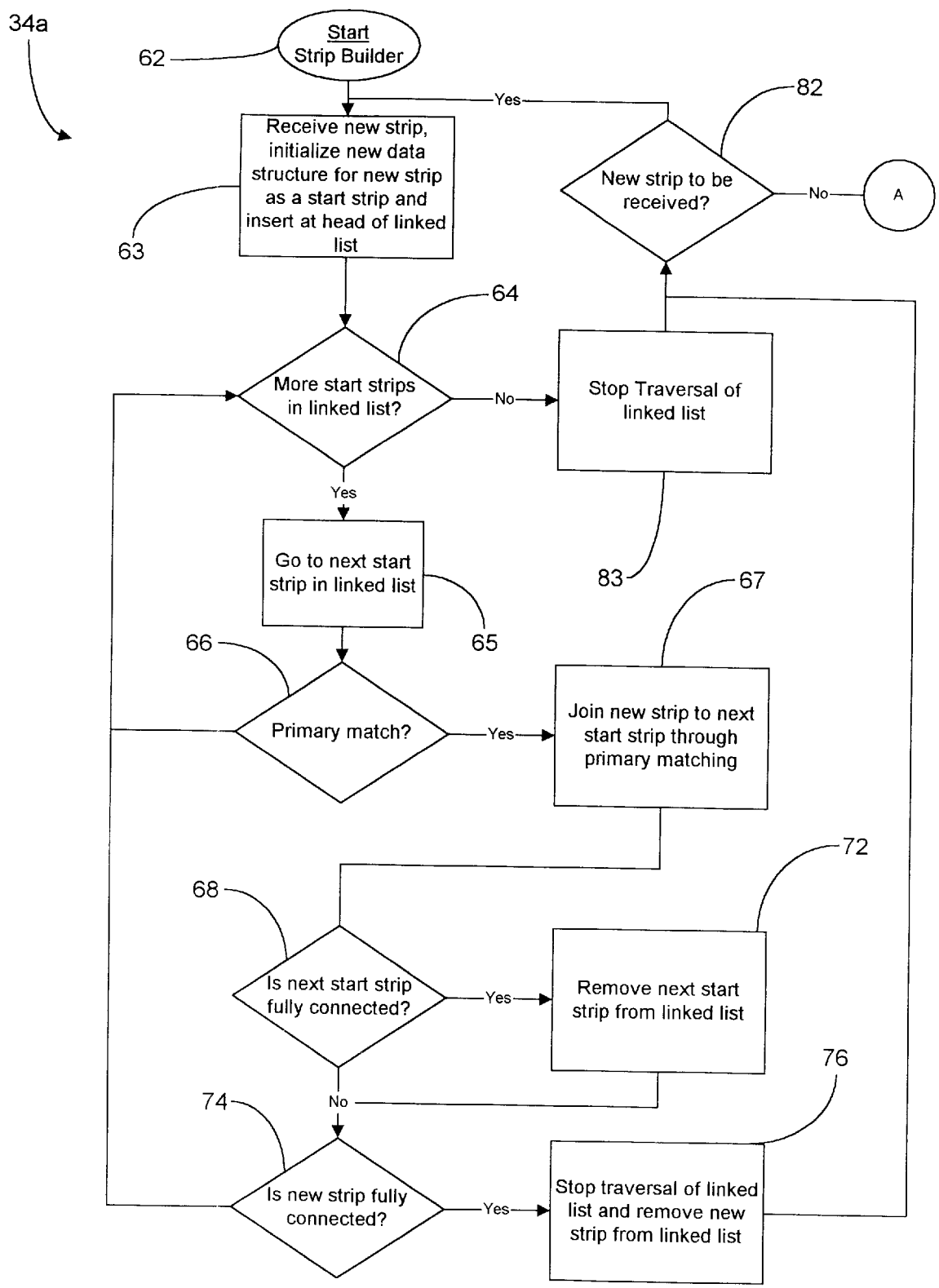
FIGS. 7A–7C is a flow chart illustrating the functionality of the strip builder of FIG. 3.
Figure 7B:
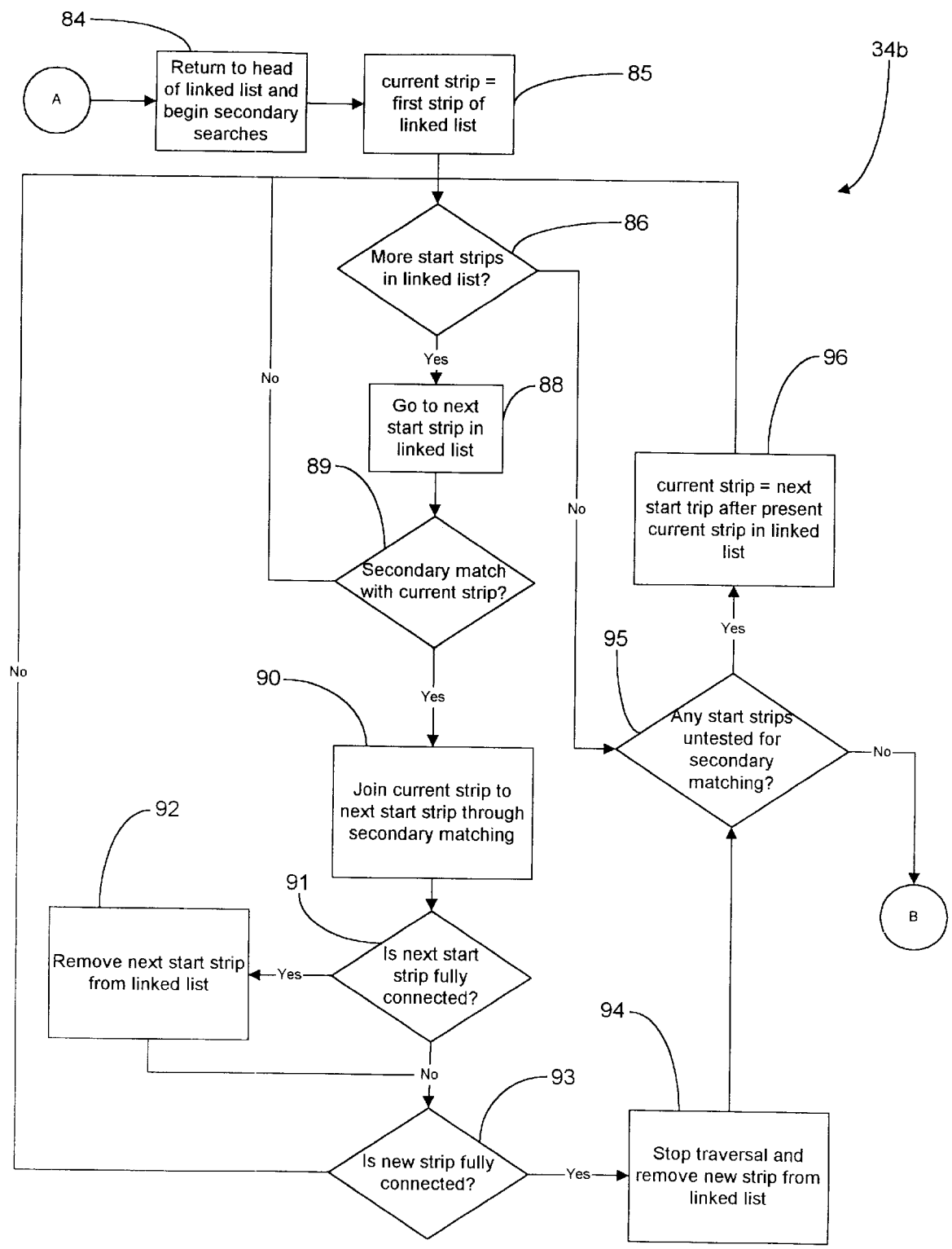

The architecture, functionality and operation of strip builder 34 is depicted in FIG. 7. Each of the flow chart blocks can be implemented as segments, modules or routines in software code. Further note that many of the indicated operations could occur in parallel despite the fact that they are shown in succession.

Upon receiving a new triangle strip from CPU 12, strip builder 34 is preferably configured to insert the new triangle strip at the head of the linked list. As depicted by blocks 62 and 63 of FIG. 7(A), strip builder 34 is preferably configured to initialize the new strip as a start strip. A start strip is any triangle strip received from CPU 12 that is not fully connected. As used herein, fully connected refers to the condition where the leading and trailing facets in a strip are matched to leading and/or trailing facets in other strips. Part of the initialization of a new strip can be the logic reduction of the strip's vertices which is discussed hereinabove.

As depicted in blocks 64 through 66, strip builder 34 is preferably configured to then test the data structures representing start strips in the linked list of data link repository 36 for any primary matches. According to blocks 67 through 72, once strip builder 34 makes a primary match, strip builder 34 is preferably designed to test the matched start strip to determine if it is fully connected. If so, strip builder 34 is preferably designed to change the flags of the matched strip to indicate that it is fully connected and should no longer be considered as a start strip. The fully connected strip may then be removed from the linked list.

As depicted by blocks 74 through 82, strip builder 34 is configured to also remove the start strip indications on the new strip and to remove the new strip from the linked list if the new strip becomes fully connected. If the new strip becomes fully connected, strip builder 34 is preferably designed to stop the traversal of the linked list and check to see if there is another new strip incoming from CPU 12. If there is another new strip, the process starts over again.

As shown by blocks 64, 82 and 83, when strip builder 34 fully traverses the linked list for primary matches to the new strip, strip builder 34 is preferably designed to receive another new strip and to search for primary matches. However, if there are no new incoming strips from CPU 12, strip builder 34 is preferably configured to traverse the linked list for any secondary matches as shown by blocks 84 through 90 in FIG. 7(B). To do this, strip builder 34 preferably returns to the first data structure in the linked list and tests the data structure against each start strip in the linked list. Blocks 91 through 94 show that strip builder 34 is designed to remove the start strip indication from any strip that becomes fully connected during this secondary search and to remove the strip from the linked list. Blocks 95 and 96 show that once a data structure has been tested for secondary matches, strip builder 34 is configured to proceed to the next start strip in the linked list and test for secondary matches with the remaining start strips.

Figure 7C:
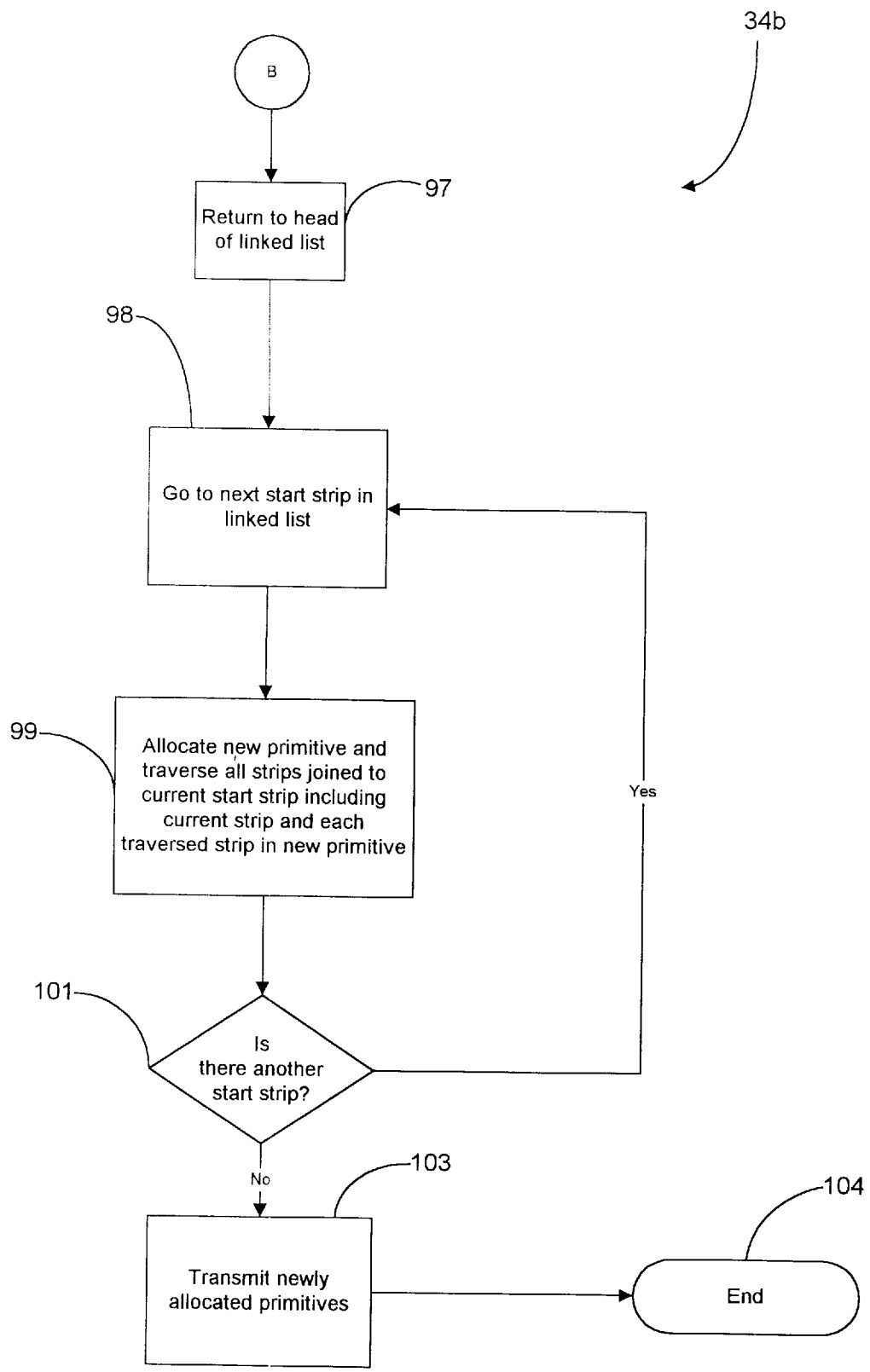

When all of the strips defining a surface of a geometric object have been tested for primary and secondary matches, strip builder 34 is preferably designed to begin traversing the linked list of start strips as depicted by blocks 97 through 98 of FIG. 7(C). As shown by block 99, strip builder 34 is preferably configured to allocate a new primitive for every start strip encountered. Through the joining procedure previously discussed, the start strip should have next pointers pointing to strips with matching vertices. Strip builder 34 is preferably configured to traverse these next pointers linking joined strips and to include each strip emanating from this traversal in the new primitive. As a result, a larger strip is built which is more efficiently defined in data than the individual strips that have been joined together to create the new larger strip.

Strip builder 34 is preferably designed to continue this process of building new larger primitives until each start strip has been allocated a new primitive as depicted by block 101. Once this occurs, blocks 103 and 104 show that strip builder 34 is preferably designed to transmit the newly created larger primitives to graphics system 16 where they can be processed for rendering on display 21. Alternatively, strip builder 34 can be designed to transmit the newly created large primitives back to an application program running on CPU 12 and memory system 14.

Special Cases

Figure 8:
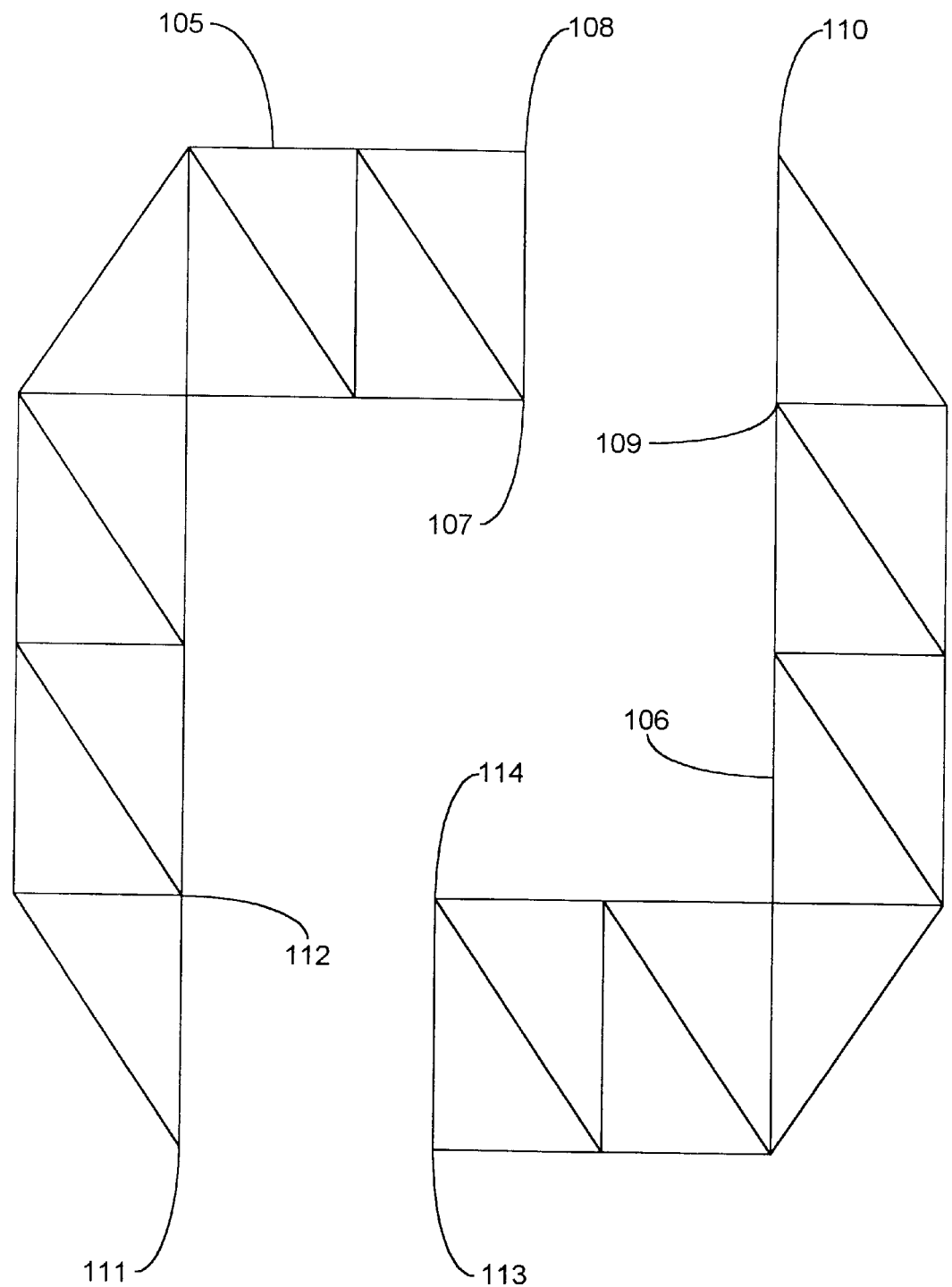
FIG. 8 is a diagram illustrating a possible circular connection of triangle strips.

It should be noted that circular connections should be prevented when joining strips together. A circular connection occurs when one strip of a joining sequence is joined the first strip of the joining sequence. For example, FIG. 8 depicts two strips 105 and 106 which may be joined together. Assume that the edge of strip 105 defined by the vertices 107 and 108 matches the edge of strip 106 defined by vertices 109 and 110. Therefore, strip builder 34 joins these two strips 105 and 106 together at these matching edges making strip 105 a first strip in a joining sequence. Furthermore, assume that the edge of strip 105 defined by the vertices 111 and 112 matches the edge of strip 106 defined by vertices 113 and 114. Before joining the matching edges defined by vertices 111, 112, 113 and 114, strip builder 34 is preferably configured to ensure that the joining of the two strips 105 and 106 will not create a circular connection.

This can be ensured by defining a pointer to the first strip in the joining sequence and testing the pointer prior to any subsequent joining attempts. In FIG. 8, when strip 105 is first joined to strip 106 at vertices 107 and 108, a pointer is preferably defined to indicate that strip 105 is the first strip of the joining sequence. Therefore, strip builder 34 knows that a circular connection is being attempted when strip 105 is found to match strip 106 at vertices 111 and 112. As a result, strip builder 34 is preferably designed to refrain from joining the two strips 105 and 106 together and to continue searching the linked list for other matches to strips 105 and 106. Accordingly, the creation of a circular connection is avoided.

Figure 9:
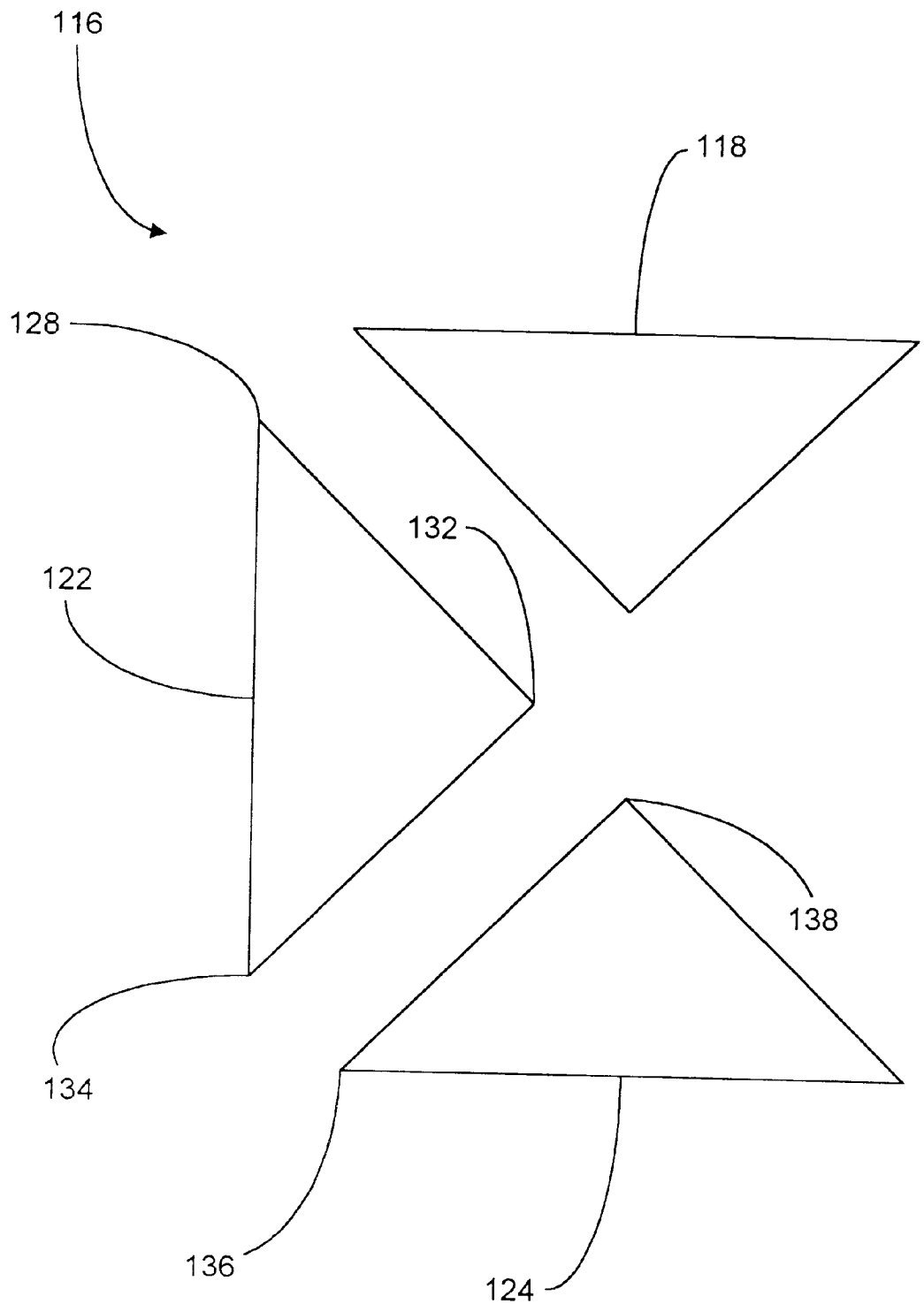
FIG. 9 is a diagram illustrating multiple matches of triangle strips.

FIG. 9 illustrates the concept that the type of matching available may depend upon a triangle's previous match. For example, assume that triangle 118 is first joined to triangle 122 and then triangle 124 is joined to triangle 122. After joining triangle 118 to triangle 122, strip builder 34 is preferably configured to remove vertices 128 and 132. It would normally be possible to join triangle 124 to triangle 122 through primary matching if vertex 132 had not already been removed. Therefore, in order to recognize that primary matching should not be attempted, strip builder 34 is preferably configured to test the number of vertices along matching edges to determine if primary matching or secondary matching should be used. When fewer than four vertices are discovered, then strip builder 34 is configured to use secondary matching. Therefore, when strip builder 34 tests the vertices of triangles 122 and 124 and discovers that there are only three vertices 134, 136, and 138 are available, then strip builder 34 is preferably configured to use secondary matching to join triangle 124 to triangle 122.

OPERATION

The preferred use and operation of the geometrical object representation system 30 and associated methodology are described hereafter.

CPU 12 communicates primitive data defining triangles to strip builder 34. Strip builder 34 uses logic techniques to quickly compare the vertices of the triangles. For example, strip builder 34 reduces each triangle edge to an unsigned integer by using the exclusive-or function on the two vertices defining the triangle edge. By skipping the comparison of edges with exclusive-or integers that do not match and only comparing the vertices of edges with exclusive-or integers that match, the process of comparing triangle vertices can be significantly reduced. It should be apparent to one skilled in the art that modifications of this technique are possible, and that any search discovering matched vertices is sufficient.

After receiving a new triangle strip and performing logic reduction, strip builder 34 inserts the new strip as a data structure at the head of the linked list in data link repository 36 setting the appropriate flags to indicate that the strip is unmatched. Any strip which has any unmatched vertices is designated as a start strip. Strip builder 34 then searches through the linked list (preferably using the exclusive-or integer values discussed hereinbefore) trying to find vertices matching the vertices of the new triangle strip. Since primary matches are more efficient than secondary matches, strip builder 34 initially searches for only primary matches.

Figure 10A:
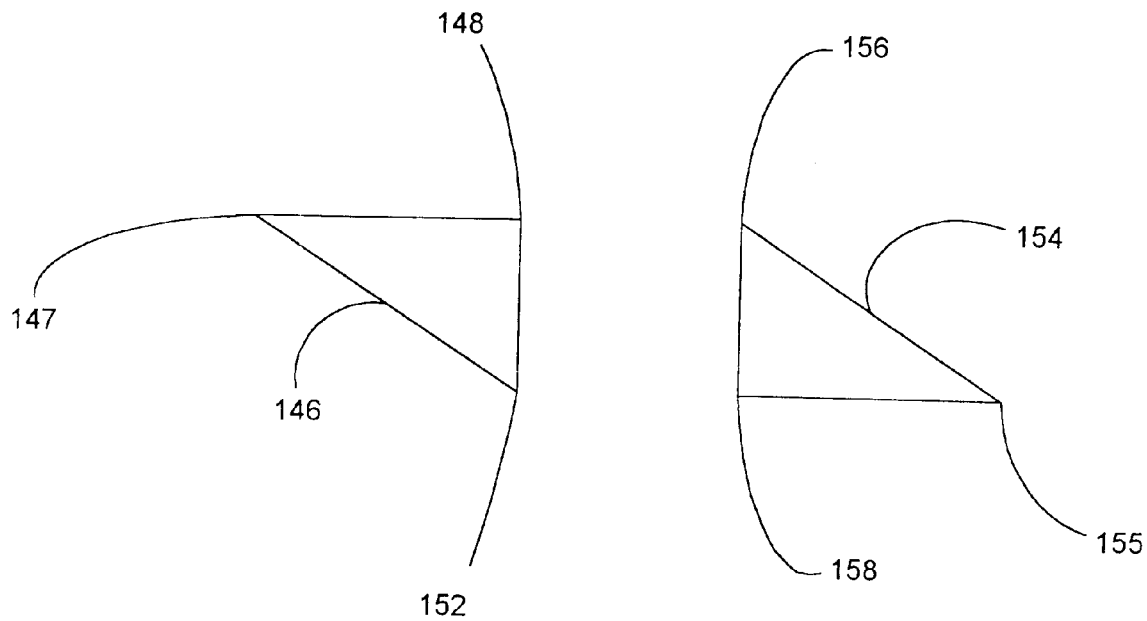
FIGS. 10A–10B is a diagram illustrating the joining of two triangles.
Figure 10B:
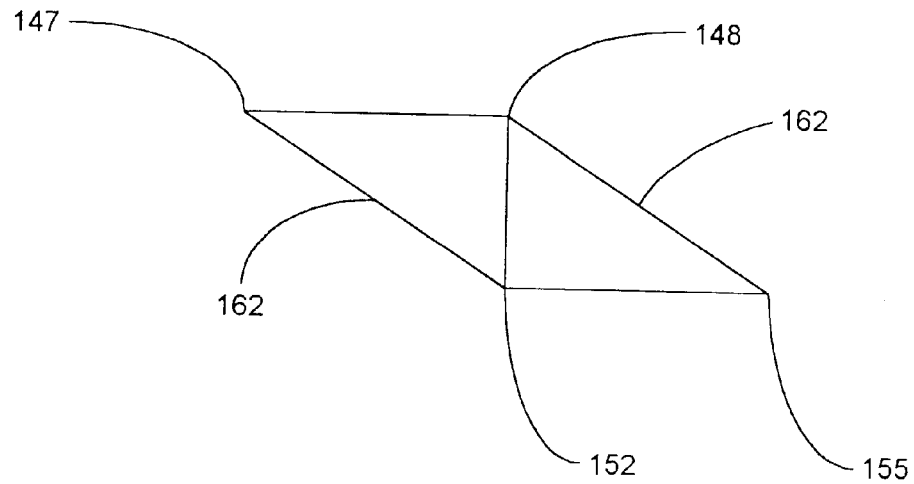

If primary matching vertices are found, strip builder 34 joins the new triangle strip to the matching strip. For illustrative purposes, assume strip 146 of FIG. 10(A) is a new triangle 146 with vertices 147, 148 and 152 and assume triangle 154 has been stored in data link repository 36 prior to the reception of new triangle 146. Further assume that vertices 148 and 152 of new triangle 146 match vertices of 156 and 158 of triangle 154, respectively. Note that the order of vertices 147, 148 and 152 and of vertices 155, 156 and 158 are in the correct orientation (clockwise and counter clockwise respectively) to enable exact primary matching. Strip builder 34, having found that the vertices of triangles 146 and 154 match, joins triangles 154 and 146 into a new larger strip 162 according to FIG. 10(B). Since triangles 146 and 154 form a primary match, vertices 156 and 158 of triangle 154 are removed by strip builder 34. As a result a triangle strip 162 is formed which is defined by less data than that required to define triangles 146 and 154 individually.

To represent in data the joining of strip 146 to strip 154, strip builder 34 sets the appropriate flags in the data structures of the matched strips 146 and 154 to record the joining. A next pointer is defined in the data structure of strip 146 to point to the data structure of strip 154 as the next strip in the joining sequence. If strip 154 becomes fully connected (all possible vertices involved in matches), then strip builder 34 sets the appropriate flags in the data structure representing strip 154 to indicate that it is completely matched and then removes the data structure from the linked list. Strip builder 34 then continues traversing the linked list for more primary matches to new strip 146.

If new strip 146 becomes fully connected, then strip builder 34 sets the appropriate flags in the data structure representing strip 146 to indicate that strip 146 is no longer a start strip and removes the data structure from the linked list. Strip builder 34 then discontinues its scan and receives another new strip and repeats the above process again.

Once all of the primitive strips representing a particular object surface have been received, strip builder 34 traverses the linked list again searching for secondary matches. If any strip becomes fully connected during this search, the appropriate flags in its data structure are set to indicate that it is fully connected and the data structure is removed from the linked list of start strips.

Once all of the strips defining an object surface have been received and tested for primary and secondary matches, strip builder 34 scans the start strips in the linked list in the order they were received from CPU 12. For every start strip data structure, strip builder 34 allocates a new triangle primitive and starts a scanning sequence following the next pointers emanating from the data structure. By traversing through the next pointers of a particular joining sequence (if any such pointers exist for the particular start strip) and including each data structure encountered into the new primitive, a new larger strip is created which includes each strip in the joining sequence. This new strip requires less data than the original representation of each individual strip. Sending only the new larger primitives created in this last scan of the start strips to graphics system 16 reduces the image data received by graphics system 16. As a result, graphics system 16 can process the image more efficiently and expediently.

In concluding the detailed description, it should be noted that it will be obvious to those skilled in the art that many variations and modifications may be made to the preferred embodiments without substantially departing from the principles of the present invention. All such variations and modifications are intended to be included herein within the scope of the present invention, as set forth in the following claims.

Wherefore, the following is claimed:

1. A geometrical object representation system for minimizing data defining a geometrical object, comprising:
    a first primitive strip having a first edge defined by a first vertex and a second vertex;
    a second primitive strip having a second edge defined by a third vertex and a fourth vertex; and
    a strip builder configured to determine whether said first vertex of said first primitive strip matches said third vertex of said second primitive strip and to join said first edge of said first primitive strip to said second edge of said second primitive strip in response to a determination that said first vertex matches said third vertex.

2. The system of claim 1, wherein said first primitive strip defines a first triangle and said second primitive strip defines a second triangle.

3. The system of claim 1, wherein said first primitive strip is a triangle strip primitive.

4. The system of claim 1, wherein said second primitive strip is a triangle strip primitive.

5. The system of claims 1, wherein said strip builder, in response to said determination, is further configured to remove said first vertex and to utilize said third vertex to define said first edge.

6. The system of claim 1, wherein said strip builder is further configured to reduce a plurality of vertex values defining said first edge to a first value by using logic reduction, to reduce a second plurality of vertex values defining said second edge to a second value by using logic reduction and to compare said first value to said second value.

7. The system of claim 1, wherein said first edge is a trailing edge of said first primitive strip and said second edge is a leading edge of said second primitive strip.

8. The system of claim 1, wherein said first edge is a trailing edge of said first primitive strip and said second edge is a trailing edge of said second primitive strip.

9. The system of claim 1, wherein said first edge is a leading edge of said first primitive strip and said second edge is a leading edge of said second primitive strip.

10. The system of claim 1, wherein said strip builder joins said first edge to said second edge through primary matching.

11. The system of claim 1, wherein said strip builder joins said first edge to said second edge through secondary matching.

12. The system of claim 1, further comprising a data list repository configured to maintain a linked list of data structures having a first data structure representing said first primitive strip and a second data structure representing said second primitive strip.

13. The system of claim 12, wherein said strip builder is further configured to insert a next pointer connecting said first data structure to said second data structure in response to said determination.

14. A geometrical object representation method for minimizing data defining a geometrical object, comprising the steps of:
receiving a first primitive strip having a first vertex;
inserting a first data structure representing said first primitive strip into a linked list of data structures, said linked list including a second data structure representing a second primitive strip;
traversing through said linked list;
determining whether said first vertex of said first primitive strip represented by said first data structure matches a second vertex of a second primitive strip represented by said second data structure;
indicating a correspondence between said first data structure and said second data structure in response to a determination in said determining step that said first vertex matches said second vertex;
removing data representing one of said vertices associated with one of said primitive strips in response to said determination; and
rendering data defining said one primitive strip to a graphical display subsequent to said removing step.

15. The method of claim 14, wherein said first primitive strip is a first triangle strip primitive and said second primitive strip is a second triangle strip primitive.

16. The method of claim 14, further comprising the steps of:
using logic reduction to represent a plurality of vertex values associated with a first edge of said first primitive strip as a first integer and to represent a plurality of vertex values associated with a second edge of said second primitive strip as a second integer; and
comparing said first integer to said second integer.

17. The method of claim 14, further comprising the step of correlating said first data structure with said second data structure via a next pointer in response to said determination that said first vertex matches said second vertex.

18. The method of claim 17, further comprising the steps of:
indicating when said first data structure becomes fully connected; and
indicating when said second data structure becomes fully connected.

19. The method of claim 17, further comprising the step of:
allocating a third primitive strip;
traversing said next pointer; and
including said first primitive strip and said second primitive strip in said third primitive strip.

20. A computer readable medium having a computer program, said computer program comprising:
a linked list of data structures having a first data structure representing a first primitive strip and a second data structure representing a second primitive strip;
logic configured to associate a next pointer with said first primitive strip and to point said next pointer to said second data structure in response to a determination that data defining a first vertex of one of said primitive strips matches data defining a second vertex of the other one of said primitive strips;
a strip builder configured to remove said data defining said first vertex in response to said determination and to correlate, via said next pointer, said data defining said second vertex with said one of said primitive strips; and
a graphical display unit configured to receive said data defining said second vertex and to utilize said received data to display said one primitive strip.

21. The medium of claim 20, wherein said first primitive strip is a first triangle strip and said second primitive strip is a second triangle strip.

22. A geometrical object representation system for minimizing data defining a geometrical object, comprising:
means for representing a first primitive strip and a second primitive strip in data;
means for determining whether a first vertex of said first primitive strip matches a second vertex of said second primitive;
means for indicating a correspondence between said first primitive strip and said second primitive strip in response to a determination by said determining means that said first vertex matches said second vertex;
means for removing one of said vertices associated with one of said primitives in response to said determination; and
means for rendering said one primitive to a graphical display based on the other one of said vertices.

23. A geometrical object representation method for minimizing data defining a geometrical object, comprising the steps of:
representing a first primitive strip and a second primitive strip in data;
determining whether a first vertex of said first primitive strip matches a second vertex of said second primitive;
indicating a correspondence between said first primitive strip and said second primitive strip in response to a determination in said determining step that said first vertex matches said second vertex;
removing one of said vertices associated with one of said primitives in response to said determination; and
rendering said one primitive to a graphical display based on the other one of said vertices.

* * * * *